(12) United States Patent
Ma et al.

(10) Patent No.: US 10,250,606 B2
(45) Date of Patent: Apr. 2, 2019

(54) NETWORK ACCESS METHOD, PROXIMITY COMMUNICATIONS SERVER, RELAY TERMINAL AND TERMINAL

(71) Applicant: Huawei Technologies Co., Ltd., Shenzhen (CN)

(72) Inventors: Jingwang Ma, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 15/068,488

(22) Filed: Mar. 11, 2016

(65) Prior Publication Data

US 2016/0197927 A1 Jul. 7, 2016

Related U.S. Application Data

(63) Continuation of application No. PCT/CN2014/076373, filed on Apr. 28, 2014.

(30) Foreign Application Priority Data

Sep. 12, 2013 (CN) .......................... 2013 1 0416241

(51) Int. Cl.
*H04L 29/06* (2006.01)
*H04W 48/04* (2009.01)
(Continued)

(52) U.S. Cl.
CPC ............ *H04L 63/10* (2013.01); *H04L 45/245* (2013.01); *H04L 63/12* (2013.01); *H04W 4/90* (2018.02);
(Continued)

(58) Field of Classification Search
CPC ....................................................... H04L 52/10
See application file for complete search history.

(56) References Cited

U.S. PATENT DOCUMENTS 8,386,640 B2 * 2/2013 Siegel ................ H04L 65/1016
709/226
9,386,077 B2 * 7/2016 Kotecha .................. H04L 67/10
(Continued)

FOREIGN PATENT DOCUMENTS

CN    102137508 A    7/2011
CN    102333330 A    1/2012
(Continued)

OTHER PUBLICATIONS

CN 201310416241.X, Office Action, dated May 4, 2018.

*Primary Examiner* — Simon P Kanaan
(74) *Attorney, Agent, or Firm* — Leydig, Voit & Mayer, Ltd.

(57) ABSTRACT

Embodiments of the present invention provide a network access method, a proximity communications server, a relay terminal, and a terminal. The method includes: receiving a relay access verification request sent by a relay terminal, where the relay access verification request is sent by a relay terminal after a relay connection request sent by a terminal is received; verifying, according to the relay access verification request, whether the terminal is authorized to perform network access by using the relay terminal; and sending a relay authorization response message to the relay terminal, where the relay authorization response message carries indication information indicating whether the terminal is allowed to perform network access by using the relay terminal. Therefore, it is achieved that communications reliability is enhanced when a mobile communications network supports a trunking communications function and when some terminals are out of a mobile communication connection or outside network coverage.

12 Claims, 10 Drawing Sheets

(51) Int. Cl.
*H04W 12/06* (2009.01)
*H04W 12/08* (2009.01)
*H04L 12/709* (2013.01)
*H04W 4/90* (2018.01)
*H04W 88/04* (2009.01)
*H04W 88/16* (2009.01)

(52) U.S. Cl.
CPC ........... *H04W 12/06* (2013.01); *H04W 12/08* (2013.01); *H04W 48/04* (2013.01); *H04W 88/04* (2013.01); *H04W 88/16* (2013.01)

(56) References Cited

U.S. PATENT DOCUMENTS

| | | | |
|---|---|---|---|
| 2004/0103282 A1* | 5/2004 | Meier | G06Q 20/3674 713/171 |
| 2009/0073915 A1 | 3/2009 | Zhang et al. | |
| 2011/0306290 A1* | 12/2011 | Fukuzawa | H04W 72/0406 455/7 |
| 2011/0314522 A1 | 12/2011 | Palanigounder et al. | |
| 2012/0003962 A1 | 1/2012 | Jeon et al. | |
| 2012/0321052 A1* | 12/2012 | Morrill | H04L 29/06027 379/32.01 |
| 2013/0078991 A1 | 3/2013 | Nam | |
| 2013/0137418 A1* | 5/2013 | He | H04W 4/001 455/419 |
| 2013/0203378 A1 | 8/2013 | Vos et al. | |
| 2013/0322388 A1 | 12/2013 | Ahn et al. | |
| 2015/0229677 A1* | 8/2015 | Gu | H04L 65/103 709/219 |
| 2016/0197927 A1* | 7/2016 | Ma | H04W 48/04 726/4 |

FOREIGN PATENT DOCUMENTS

| | | |
|---|---|---|
| CN | 102802125 A | 11/2012 |
| EP | 1864447 A1 | 10/2006 |
| JP | 2012209609 A | 10/2012 |
| KR | 20110033079 A | 3/2011 |
| KR | 20120063081 A | 6/2012 |
| KR | 20120074255 A | 7/2012 |
| WO | WO 2006103276 A1 | 10/2006 |
| WO | 2010101442 A2 | 9/2010 |
| WO | WO 2012163302 A1 | 6/2012 |

* cited by examiner

NETWORK ACCESS METHOD, PROXIMITY COMMUNICATIONS SERVER, RELAY TERMINAL AND TERMINAL

CROSS-REFERENCE TO RELATED APPLICATIONS

This application is a continuation of International Patent Application No. PCT/CN2014/076373, filed on Apr. 28, 2014, which claims priority to Chinese Patent Application No. 201310416241.X, filed on Sep. 12, 2013, both of which are hereby incorporated by reference in their entireties.

TECHNICAL FIELD

Embodiments of the present invention relate to communications technologies, and in particular, to a network access method, a proximity communications server, a relay terminal, and a terminal.

BACKGROUND

In the field of public security such as fire control and disaster relief, a dedicated trunking communications system is used to implement communication between related staff members, so that a working progress can be reported between the staff members and the staff members can obtain a task. To ensure that staff members understand site conditions and make decisions in time, the trunking communications system is required to be capable of implementing a communications mode such as video communication that requires a high access rate, so that work such as fire control work, disaster relief work, and other work are effectively completed.

To satisfy requirements of the public security field on high-rate communication, a mobile communications network, such as a fourth-generation communications network, operated by an operator is enhanced in the prior art, so that the mobile communications network supports trunking communications. Therefore, high-rate access provided by the mobile communications network can be used in trunking communications to satisfy public security requirements. Specifically, a terminal used for trunking communications accesses a mobility management entity and a gateway device by using a radio access network, and further accesses a trunking communications server by using a gateway. The trunking communications server that is responsible for call management of trunking communications, management of trunking group members, and the like sends trunking communications information (including a voice, a video, and the like) to the terminal in a multimedia broadcast multicast service (Multimedia Broadcast Multicast Service, MBMS) manner or in a unicast manner.

In the foregoing technical solution, the terminal used for trunking communications is required to be located in network coverage and access the mobile communications network. However, in a practical trunking communications application, for example, in a fire rescue scenario or another scenario, it is impossible that all terminals are located in the network coverage. Consequently, a terminal outside the network coverage is incapable of using a trunking communications function by means of the mobile communications network; in this case, staff members cannot report situations of a working site in time, obtain a task, or the like, and communications reliability is low.

SUMMARY

Embodiments of the present invention provide a network access method, a proximity communications server, a relay terminal, and a terminal, so as to achieve that communications reliability is enhanced when a mobile communications network supports a trunking communications function and when some terminals are out of a mobile communication connection or outside network coverage.

According to a first aspect, an embodiment of the present invention provides a network access method, including:
  receiving a relay access verification request sent by a relay terminal, where the relay access verification request is sent by the relay terminal after a relay connection request sent by a terminal is received;
  verifying, according to the relay access verification request, whether the terminal is authorized to perform network access by using the relay terminal; and
  sending a relay authorization response message to the relay terminal, where the relay authorization response message carries indication information indicating whether the terminal is allowed to perform network access by using the relay terminal.

In a first possible implementation manner of the first aspect, if the terminal is authorized to perform network access by using the relay terminal, after the sending a relay authorization response message to the relay terminal, the method includes:
  sending, to the relay terminal, at least one network address that the terminal is allowed to access, so that the relay terminal allocates a network address to the terminal.

With reference to the first possible implementation manner of the first aspect, in a second possible implementation manner of the first aspect, the at least one network address includes:
  a network address of a trunking communications server, where the trunking communications server is a trunking communications server corresponding to a trunking communications group to which the terminal belongs, and there is at least one trunking communications server.

With reference to the second possible implementation manner of the first aspect, in a third possible implementation manner of the first aspect, before the sending an address of a trunking communications server to the relay terminal, the method further includes:
  acquiring, from a home subscriber server, group information of the trunking communications group to which the terminal belongs; and
  acquiring the network address of the trunking communications server from the group information.

With reference to the first possible implementation manner of the first aspect, in a fourth possible implementation manner of the first aspect, the at least one network address includes:
  a network address of a trunking communications server corresponding to a trunking communications group that the terminal is allowed to join, where there is at least one trunking communications group that the terminal is allowed to join.

With reference to the fourth possible implementation manner of the first aspect, in a fifth possible implementation manner of the first aspect, before a network address of a trunking communications server corresponding to a trunking communications group that the terminal has joined is sent to the relay terminal, the method further includes:
  receiving a group registration request message sent by the terminal, where the group registration request message carries a group identifier of a trunking communications group that the terminal intends to join;

sending a group registration notice message to a trunking communications server indicated by the group identifier, so that the trunking communications server verifies whether the terminal is authorized to join the trunking communications group; and sending a group registration response message to the terminal, where the group registration response message carries verification information indicating whether the trunking communications server authorizes the terminal to join the trunking communications group.

With reference to the first aspect, in a sixth possible implementation manner of the first aspect, the method further includes:

if the terminal is authorized to perform network access by using the relay terminal, sending, to the relay terminal, a terminal identifier of the terminal and a group identifier of a trunking communications group to which the terminal belongs, so that the relay terminal acquires, according to the group identifier, a network address corresponding to the group identifier.

With reference to the sixth possible implementation manner of the first aspect, in a seventh possible implementation manner of the first aspect, if the terminal is authorized to perform network access by using the relay terminal, before the sending, to the relay terminal, a terminal identifier of the terminal and a group identifier of a trunking communications group to which the terminal belongs, the method further includes:

sending, to the relay terminal, group information that carries a correspondence between the group identifier and the network address.

With reference to the first aspect or any of the first to seventh possible implementation manners of the first aspect, in an eighth possible implementation manner of the first aspect, before the receiving a relay access verification request sent by a relay terminal, the method further includes:

authorizing the relay terminal to activate a relay function.

With reference to the eighth possible implementation manner of the first aspect, in a ninth possible implementation manner of the first aspect, before the authorizing the relay terminal to activate a relay function, the method further includes:

receiving a relay authorization request message sent by a mobility management entity, where the relay authorization request message is sent after the mobility management entity receives a relay activation request message sent by the relay terminal; and after the authorizing the relay terminal to activate a relay function, the method includes:

if the relay terminal can activate the relay function, sending the relay authorization response message to the mobility management entity, so that the mobility management entity instructs the relay terminal to activate the relay function.

With reference to the eighth possible implementation manner of the first aspect, in a tenth possible implementation manner of the first aspect, before the authorizing the relay terminal to activate a relay function, the method further includes:

receiving a relay activation request sent by the trunking communications server, where the trunking communications server is a trunking communications server corresponding to a trunking communications group to which the relay terminal belongs; and after the authorizing the relay terminal to activate a relay function, the method includes:

sending a relay activation response message to the trunking communications server if the relay terminal can activate the relay function.

According to a second aspect, an embodiment of the present invention provides a network access method, including:

receiving a relay connection request sent by a terminal;

sending a relay access verification request to a proximity communications server, so that the proximity communications server verifies whether the terminal is authorized to perform network access in a relay manner; and receiving a relay authorization response message sent by the proximity communications server, where the relay authorization response message carries indication information indicating whether the terminal is allowed to perform network access in the relay manner.

In a first possible implementation manner of the second aspect, if the proximity communications server authorizes the terminal to perform network access in the relay manner, after the receiving a relay authorization response message sent by the proximity communications server, the method further includes:

receiving at least one network address that the terminal is allowed to access and that is sent by the proximity communications server; and allocating a network address to the terminal.

In a second possible implementation manner of the second aspect, if the proximity communications server authorizes the terminal to perform network access in the relay manner, after the receiving a relay authorization response message sent by the proximity communications server, the method further includes:

receiving a terminal identifier of the terminal and a group identifier of a trunking communications group to which the terminal belongs, where the terminal identifier and the group identifier are sent by the proximity communications server;

acquiring, according to the group identifier, a network address of a trunking communications server corresponding to the group identifier; and allocating the acquired network address to the terminal.

With reference to the second possible implementation manner of the second aspect, in a third possible implementation manner of the second aspect, before the receiving a terminal identifier of the terminal and a group identifier of a trunking communications group to which the terminal belongs, where the terminal identifier and the group identifier are sent by the proximity communications server, the method further includes:

receiving group information sent by the proximity communications server, where the group information carries a correspondence between the group identifier and the network address of the trunking communications server.

With reference to the second aspect or the first, second, or third possible implementation manner of the second aspect, in a fourth possible implementation manner of the second aspect, before the receiving a relay connection request sent by a terminal, the method further includes:

activating a relay function.

With reference to the fourth possible implementation manner of the second aspect, in a fifth possible implementation manner of the second aspect, before the activating a relay function, the method further includes:

sending a relay activation request message to a mobility management entity, so that the mobility management entity sends a relay authorization request message to the proximity communications server, and the proximity communications server authorizes activation of the relay function; and after the activating a relay function, the method includes: receiving a relay authorization activation message sent by the mobility management entity.

With reference to the fourth possible implementation manner of the second aspect, in a sixth possible implementation manner of the second aspect, before the activating a relay function, the method includes:

sending a registration request to the trunking communications server, so as to join a trunking communications group corresponding to the trunking communications server;

receiving a relay activation request sent by the proximity communications server; and sending a relay activation response message to the proximity communications server.

According to a third aspect, an embodiment of the present invention provides a network access method, including:

sending a relay connection request to a relay terminal, so as to request to perform network access by using the relay terminal; and receiving a relay connection response message sent by the relay terminal, where the relay connection response message is sent by the relay terminal after a relay authorization response message sent by a proximity communications server is received, and the relay connection response message carries indication information indicating whether network access can be performed by using the relay terminal.

In a first possible implementation manner of the third aspect, the method further includes:

receiving a network address allocated by the relay terminal; and performing network access according to the network address.

According to a fourth aspect, an embodiment of the present invention provides a proximity communications server, including:

a receiving module, configured to receive a relay access verification request sent by a relay terminal, where the relay access verification request is sent by the relay terminal after a relay connection request sent by a terminal is received;

a processing module, configured to verify, according to the relay access verification request received by the receiving module, whether the terminal is authorized to perform network access by using the relay terminal; and a sending module, configured to send a relay authorization response message to the relay terminal, where the relay authorization response message carries indication information indicating whether the terminal is allowed to perform network access by using the relay terminal.

In a first possible implementation manner of the fourth aspect, the sending module is further configured to send, to the relay terminal, at least one network address that the terminal is allowed to access, so that the relay terminal allocates a network address to the terminal.

With reference to the first possible implementation manner of the fourth aspect, in a second possible implementation manner of the fourth aspect, the at least one network address includes:

a network address of a trunking communications server, where the trunking communications server is a trunking communications server corresponding to a trunking communications group to which the terminal belongs, and there is at least one trunking communications server.

With reference to the second possible implementation manner of the fourth aspect, in a third possible implementation manner of the fourth aspect, the processing module is configured to acquire, from a home subscriber server, group information of the trunking communications group to which the terminal belongs, and acquire the network address of the trunking communications server from the group information.

With reference to the first possible implementation manner of the fourth aspect, in a fourth possible implementation manner of the fourth aspect, the at least one network address includes:

a network address of a trunking communications server corresponding to a trunking communications group that the terminal is allowed to join, where there is at least one trunking communications group that the terminal is allowed to join.

With reference to the fourth possible implementation manner of the fourth aspect, in a fifth possible implementation manner of the fourth aspect, the receiving module is configured to receive a group registration request message sent by the terminal, where the group registration request message carries a group identifier of a trunking communications group that the terminal intends to join;

the sending module is configured to send a group registration notice message to a trunking communications server indicated by the group identifier, so that the trunking communications server verifies whether the terminal is authorized to join the trunking communications group; and the sending module is further configured to send a group registration response message to the terminal, where the group registration response message carries verification information indicating whether the trunking communications server authorizes the terminal to join the trunking communications group.

With reference to the fourth aspect, in a sixth possible implementation manner of the fourth aspect, the sending module is further configured to: if the processing module authorizes the terminal to perform network access by using the relay terminal, send, to the relay terminal, a terminal identifier of the terminal and a group identifier of a trunking communications group to which the terminal belongs, so that the relay terminal acquires, according to the group identifier, a network address corresponding to the group identifier.

With reference to the sixth possible implementation manner of the fourth aspect, in a seventh possible implementation manner of the fourth aspect, the sending module is further configured to send, to the relay terminal, group information that carries a correspondence between the group identifier and the network address.

With reference to the fourth aspect or any of the first to seventh possible implementation manners of the fourth aspect, in an eighth possible implementation manner of the fourth aspect, the processing module is further configured to authorize the relay terminal to activate a relay function.

With reference to the eighth possible implementation manner of the fourth aspect, in a ninth possible implementation manner of the fourth aspect, the receiving module is configured to receive a relay authorization request message sent by a mobility management entity, where the relay authorization request message is sent after the mobility management entity receives a relay activation request message sent by the relay terminal; and the sending module is configured to: if the relay terminal can activate the relay function, send the relay authorization response message to the mobility management entity, so that the mobility management entity instructs the relay terminal to activate the relay function.

With reference to the eighth possible implementation manner of the fourth aspect, in a tenth possible implementation manner of the fourth aspect, the receiving module is configured to receive a relay activation request sent by the trunking communications server, where the trunking communications server is a trunking communications server corresponding to a trunking communications group to which the relay terminal belongs; and the sending module is configured to send a relay activation response message to the trunking communications server if the relay terminal can activate the relay function.

According to a fifth aspect, an embodiment of the present invention provides a relay terminal, including:

a receiving module, configured to receive a relay connection request sent by a terminal; and a sending module, configured to send a relay access verification request to a proximity communications server, so that the proximity communications server verifies whether the terminal is authorized to perform network access in a relay manner, where the receiving module is further configured to receive a relay authorization response message sent by the proximity communications server, where the relay authorization response message carries indication information indicating whether the terminal is allowed to perform network access in the relay manner.

In a first possible implementation manner of the fifth aspect, the receiving module is configured to receive at least one network address that the terminal is allowed to access and that is sent by the proximity communications server; and
the relay terminal further includes:
a first processing module, configured to allocate a network address to the terminal.

In a second possible implementation manner of the fifth aspect, the receiving module is configured to receive a terminal identifier of the terminal and a group identifier of a trunking communications group to which the terminal belongs, where the terminal identifier and the group identifier are sent by the proximity communications server; and
the relay terminal further includes:
a second processing module, configured to: acquire, according to the group identifier, a network address of a trunking communications server corresponding to the group identifier, and allocate the acquired network address to the terminal.

With reference to the second possible implementation manner of the fifth aspect, in a third possible implementation manner of the fifth aspect, the receiving module is configured to receive group information sent by the proximity communications server, where the group information carries a correspondence between the group identifier and the network address of the trunking communications server.

With reference to the fifth aspect or the first, second, or third possible implementation manner of the fifth aspect, in a fourth possible implementation manner of the fifth aspect, the relay terminal further includes:
an activating module, configured to activate a relay function.

With reference to the fourth possible implementation manner of the fifth aspect, in a fifth possible implementation manner of the fifth aspect, the sending module is configured to send a relay activation request message to a mobility management entity, so that the mobility management entity sends a relay authorization request message to the proximity communications server, and the proximity communications server authorizes activation of the relay function; and
the receiving module is configured to receive a relay authorization activation message sent by the mobility management entity.

With reference to the fourth possible implementation manner of the fifth aspect, in a sixth possible implementation manner of the fifth aspect, the sending module is configured to send a registration request to the trunking communications server, so as to join a trunking communications group corresponding to the trunking communications server;
the receiving module is configured to receive a relay activation request sent by the proximity communications server; and
the sending module is further configured to send a relay activation response message to the proximity communications server.

According to a sixth aspect, an embodiment of the present invention provides a terminal, including:
a sending module, configured to send a relay connection request to a relay terminal, so as to request to perform network access by using the relay terminal; and
a receiving module, configured to receive a relay connection response message sent by the relay terminal, where the relay connection response message is sent by the relay terminal after a relay authorization response message sent by a proximity communications server is received, and the relay connection response message carries indication information indicating whether network access can be performed by using the relay terminal.

In a first possible implementation manner of the sixth aspect, the terminal further includes a processing module;
the receiving module is configured to receive a network address allocated by the relay terminal; and
the processing module is configured to perform network access according to the network address.

According to the network access method, the proximity communications server, the relay terminal, and the terminal that are provided in the embodiments of the present invention, the proximity server verifies whether the terminal is authorized to perform network access in a relay manner, so as to achieve that communications reliability is enhanced when a mobile communications network supports a trunking communications function and when some terminals are out of a mobile communication connection or outside network coverage.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
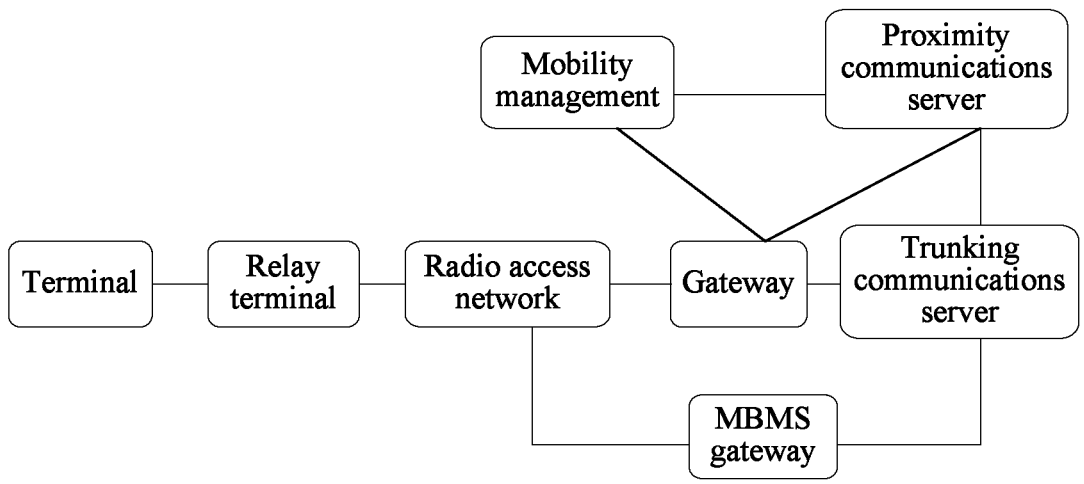
FIG. 1 is a schematic diagram of a communications network architecture to which a network access method of the present invention is applicable.

FIG. 1 is a schematic diagram of a communications network architecture to which a network access method of the present invention is applicable. For clarity of description, a relay terminal mentioned below is a terminal that has a relay capability, and a terminal mentioned below is a terminal that has or does not have the relay capability and that is outside network coverage or out of a communication connection. As shown in FIG. 1, after being authorized by a proximity communications server on a network side, a relay terminal in a mobile communications network activates a relay (relay) function, and a terminal that is outside network coverage or out of a communication connection discovers the relay terminal and requests to access the mobile communications network by using the relay terminal, and the authorized relay terminal establishes a communication connection to the terminal in a proximity communications mode and allocates a network address to the terminal. After accessing the network by using the relay terminal, the terminal sends a trunking communication request to the network side. After being approved by the network side, the terminal accesses a gateway by using the relay terminal, and then accesses a trunking communications server. The trunking communications server sends trunking communications information (including a voice, a video, and the like) to the terminal in an MBMS broadcast manner or in a unicast manner by using the relay terminal.

Figure 2:
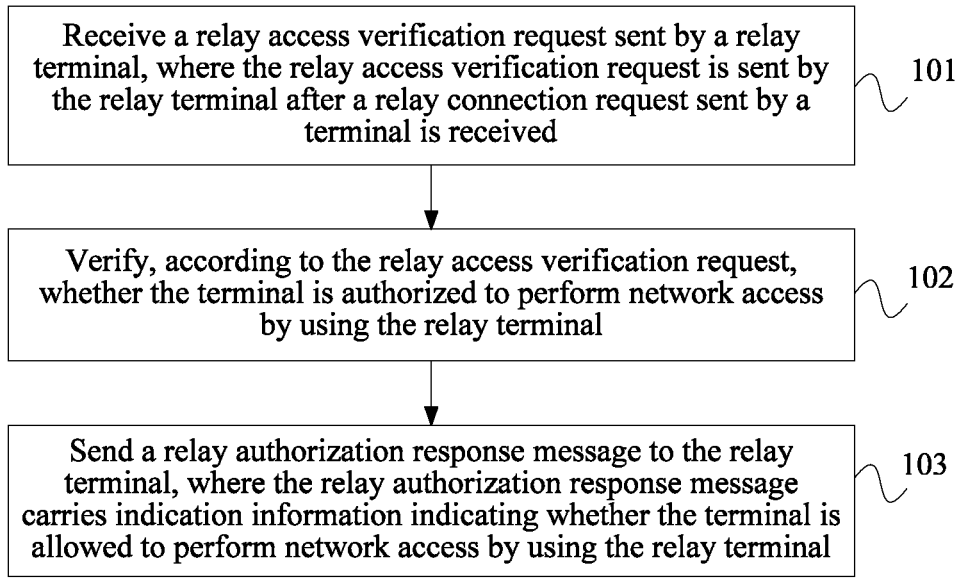
FIG. 2 is a flowchart of Embodiment 1 of a network access method according to the present invention.

FIG. 2 is a flowchart of Embodiment 1 of a network access method according to the present invention. This embodiment is performed by a proximity communications server, and is applicable to a scenario in which some terminals need to perform, when the terminals are out of a mobile communication connection or outside network coverage, network access by using a relay terminal. Specifically, this embodiment includes the following steps:

101. Receive a relay access verification request sent by a relay terminal, where the relay access verification request is sent by the relay terminal after a relay connection request sent by a terminal is received.

The proximity server is disposed in a communications network, and the proximity server authorizes whether the relay terminal can activate a relay, and whether a terminal outside network coverage can perform network access by using the relay terminal, or join a trunking communications group by using the relay terminal, or perform other work by using the relay terminal. In this step, after receiving the relay connection request sent by the terminal, the relay terminal sends, to the proximity communications server, a relay access verification request that carries an identifier of the terminal such as a proximity service (Proximity Service, ProSe) identifier, and requests the proximity communications server whether to authorize the terminal to perform network access by using the relay terminal, namely, in a relay manner.

102. Verify, according to the relay access verification request, whether the terminal is authorized to perform network access by using the relay terminal.

After receiving the relay access verification request, the proximity communications server may verify, according to a preset policy or the like, whether the terminal is authorized to perform network access in the relay manner. For example, the proximity server allows only a non-roaming terminal to use the relay terminal to access a network, and does not allow a roaming terminal to access the network by using the relay terminal.

103. Send a relay authorization response message to the relay terminal, where the relay authorization response message carries indication information indicating whether the terminal is allowed to perform network access by using the relay terminal.

In this step, the proximity communications server adds, to a relay authorization response message, indication information that is obtained by means of the verification and that indicates whether the terminal is allowed to perform network access by using the relay terminal, and sends the relay authorization response message to the relay terminal, so that the relay terminal allows or disallows access of the terminal according to the indication information.

According to the network access method provided in this embodiment of the present invention, a proximity server verifies whether a terminal is authorized to perform network access in a relay manner, so as to achieve that a trunking communications function can be used normally by means of a relay terminal when some terminals are out of a mobile communication connection or outside network coverage, thereby enhancing communications reliability when a mobile communications network supports the trunking communications function.

Further, in Embodiment 1 above, if the proximity server verifies that the terminal is allowed to perform network access in the relay manner, a network address that is allowed to be accessed by the terminal should further be provided for the relay terminal. Specifically, if the terminal is authorized to perform network access by using the relay terminal, after sending the relay authorization response message to the relay terminal, the proximity communications server sends, to the relay terminal, at least one network address that the terminal is allowed to access, so that the relay terminal allocates a network address to the terminal.

Still further, the at least one network address may be a network address of a trunking communications server corresponding to a trunking communications group to which the terminal belongs when the terminal is not allowed to join a specific trunking communications group after the terminal is allowed to join the network. For example, the proximity communications server finds, by means of verification, that the terminal belongs to a trunking communications group A, a trunking communications group B, and a trunking communications group C, and in this case, the terminal does not join the three groups; therefore, the proximity communications server sends, to the relay terminal, network addresses of trunking communications servers corresponding to the three trunking communications groups.

Still further, the at least one network address may be a network address of a trunking communications server corresponding to a trunking communications group that the terminal is allowed to join after the terminal is allowed to join the network. For example the proximity communications server finds, by means of verification, that the terminal belongs to a trunking communications group A, a trunking communications group B, and a trunking communications group C, and only the trunking communications group C allows the terminal to join; therefore, the proximity communications server sends a network address of a trunking communications server corresponding to the trunking communications group C to the relay terminal.

Further, the proximity server may acquire, from a home subscriber server that stores subscriber subscription data, group information of the trunking communications group to which the terminal belongs, and acquire the network address of the trunking communications server from the group information.

Further, the at least one network address may be a network address that the terminal is allowed to access and that is carried in an access configuration request message. In this case, the network address is not limited to the network address of the trunking communications server corresponding to the trunking communications group to which the terminal belongs.

Further, if the relay terminal stores a correspondence between a group identifier of a trunking communications group and a network address of a trunking communications server, for example, if the terminal is authorized to perform network access by using the relay terminal, the proximity communications server may send group information to the relay terminal in advance, so that the relay terminal stores the group information, where the group information carries the correspondence between the group identifier and the network address. When the network address needs to be provided subsequently, if the terminal is authorized to perform network access by using the relay terminal, the proximity communications server may not send the network address to the relay terminal, but send only a terminal identifier of the terminal and the group identifier to the relay terminal, so that the relay terminal searches for and acquires, according to the group identifier, the network address corresponding to the group identifier, and allocates the network address to the terminal.

Further, before the terminal performs network access by using the relay terminal, the proximity communications server needs to authorize the relay terminal to activate a relay function.

Specifically, the relay terminal may request activation of the relay function from a network side. In this process, the relay terminal sends a relay activation request message to a mobility management entity, so that the mobility management entity sends a relay authorization request message to the proximity communications server, and the proximity communications server determines whether to authorize the relay terminal to activate the relay function.

Alternatively, a network side instructs the relay terminal to activate the relay function. In this process, the relay terminal joins a trunking communications group by means of registration, and a trunking communications server corresponding to the trunking communications group sends a relay activation request to the proximity communications server when determining that the relay terminal needs to activate the relay function, so that the proximity communications server determines whether to authorize the relay terminal to activate the relay function.

Figure 3:
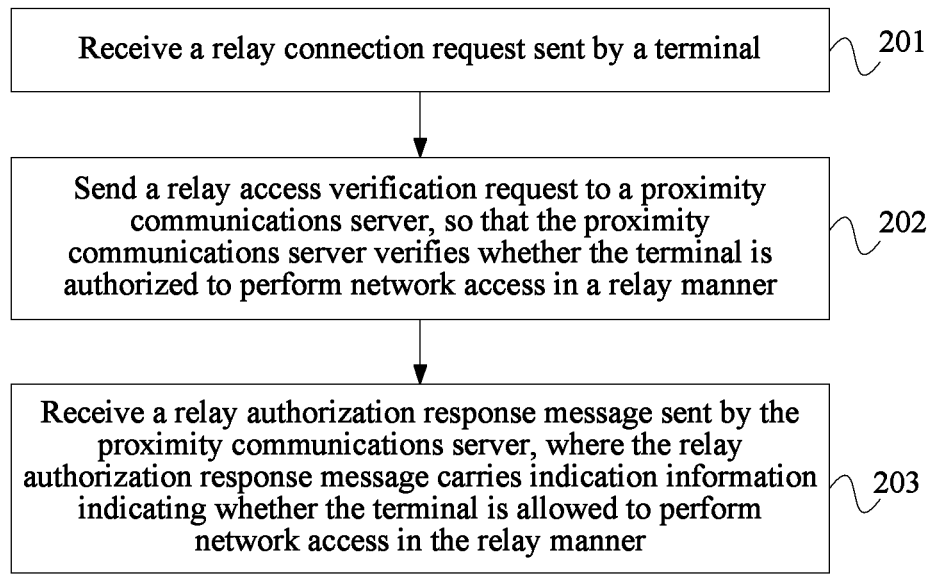
FIG. 3 is a flowchart of Embodiment 2 of a network access method according to the present invention.

FIG. 3 is a flowchart of Embodiment 2 of a network access method according to the present invention. This embodiment is performed by a relay terminal, and is applicable to a scenario in which some terminals need to perform, when the terminals are out of a mobile communication connection or outside network coverage, network access by using the relay terminal. Specifically, this embodiment includes the following steps:

201. Receive a relay connection request sent by a terminal.

When the terminal is out of a communication connection or moves out of network coverage, the terminal discovers a relay terminal and sends a relay connection request to the relay terminal, and the relay terminal receives the relay connection request.

202. Send a relay access verification request to a proximity communications server, so that the proximity communications server verifies whether the terminal is authorized to perform network access in a relay manner.

The relay terminal sends the relay access verification request to the proximity server by using a radio access network, so as to request the proximity communications server to verify whether the terminal is authorized to perform network access in the relay manner.

203. Receive a relay authorization response message sent by the proximity communications server, where the relay authorization response message carries indication information indicating whether the terminal is allowed to perform network access in the relay manner.

After verifying the terminal, the proximity communications server sends the relay authorization response message to the relay terminal to notify, by using the relay terminal, whether the terminal can perform access in the relay manner.

According to the network access method provided in this embodiment of the present invention, a relay terminal sends a relay access verification request to a proximity server, so that the proximity server verifies whether a terminal is authorized to perform network access in a relay manner. Therefore, it is achieved that a trunking communications function can be used normally by means of the relay terminal when some terminals are out of a mobile communication connection or outside network coverage, thereby enhancing communications reliability when a mobile communications network supports the trunking communications function.

Further, if the proximity communications server authorizes the terminal to perform network access in the relay manner, after receiving the relay authorization response message sent by the proximity communications server, the relay terminal receives at least one network address that the terminal is allowed to access and that is sent by the proximity communications server, and allocates a network address to the terminal.

Further, if the proximity communications server authorizes the terminal to perform network access in the relay manner, after receiving the relay authorization response message sent by the proximity communications server, the relay terminal receives a terminal identifier of the terminal and a group identifier of a trunking communications group to which the terminal belongs, where the terminal identifier and the group identifier are sent by the proximity communications server; and acquires, according to the group identifier, a network address of a proximity communications server corresponding to the group identifier and allocates the acquired network address to the terminal.

Further, before receiving the terminal identifier of the terminal and the group identifier of the trunking communications group to which the terminal belongs, the relay terminal receives group information sent by the proximity communications server, where the terminal identifier and the group identifier are sent by the proximity communications server, and the group information carries a correspondence between the group identifier and a network address of a trunking communications server.

Further, before receiving the relay connection request sent by the terminal, the relay terminal further needs to activate a relay function.

Further, before activating the relay function, the relay terminal sends a relay activation request message to a mobility management entity, so that the mobility management entity sends a relay authorization request message to the proximity communications server, and the proximity communications server authorizes activation of the relay function; after activating the relay function, the relay terminal receives a relay authorization activation message sent by the mobility management entity.

Further, before activating the relay function, the relay terminal sends a registration request to the trunking communications server, so as to join a trunking communications group corresponding to the trunking communications server; receives a relay activation request sent by the proximity communications server; and sends a relay activation response message to the proximity communications server.

For a process of communication between the relay terminal and the proximity communications server, reference may be made to the embodiment shown in FIG. 2, and details are not described herein again.

Figure 4:
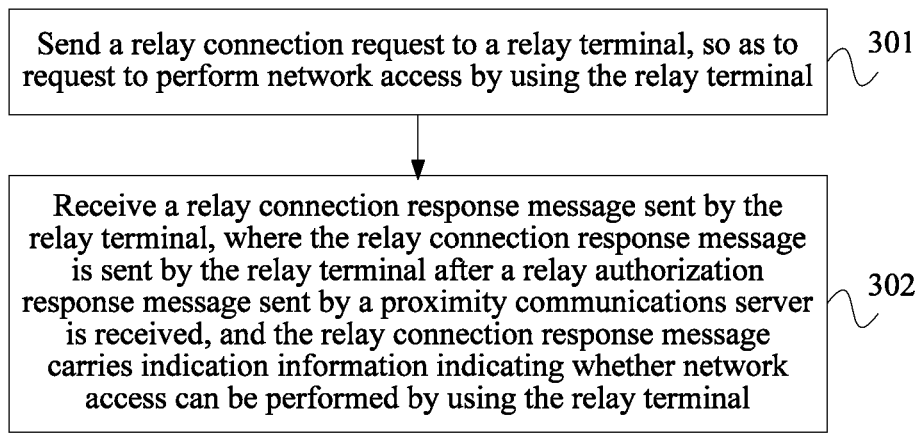
FIG. 4 is a flowchart of Embodiment 3 of a network access method according to the present invention.

FIG. 4 is a flowchart of Embodiment 3 of a network access method according to the present invention. This embodiment is performed by a terminal, and is applicable to a scenario in which some terminals need to perform, when the terminals are out of a mobile communication connection or outside network coverage, network access by using a relay terminal. Specifically, this embodiment includes the following steps:

301. Send a relay connection request to a relay terminal, so as to request to perform network access by using the relay terminal.

When the terminal is out of the communication connection or moves out of network coverage, the terminal discovers a relay terminal and sends a relay connection request to the relay terminal.

302. Receive a relay connection response message sent by the relay terminal, where the relay connection response message is sent by the relay terminal after a relay authorization response message sent by a proximity communications server is received, and the relay connection response message carries indication information indicating whether network access can be performed by using the relay terminal.

According to the network access method provided in this embodiment of the present invention, a terminal that is out of a communication connection or moves out of network coverage sends a relay connection request to a relay terminal, and the relay terminal sends a relay access verification request to a proximity server, so that the proximity server verifies whether the terminal is authorized to perform network access in a relay manner. Therefore, it is achieved that a trunking communications function can be used normally by means of the relay terminal when some terminals are out of a mobile communication connection or outside network coverage, thereby enhancing communications reliability when a mobile communications network supports the trunking communications function.

Further, the terminal further receives a network address allocated by the relay terminal, and performs network access according to the network address.

In this embodiment, for a process of interaction between the terminal and the proximity communications server, reference may be made to the embodiment shown in FIG. 2; for interaction between the terminal and the relay terminal, reference may be made to the embodiment shown in FIG. 3; for a specific process, details are not described herein again.

Figure 5:
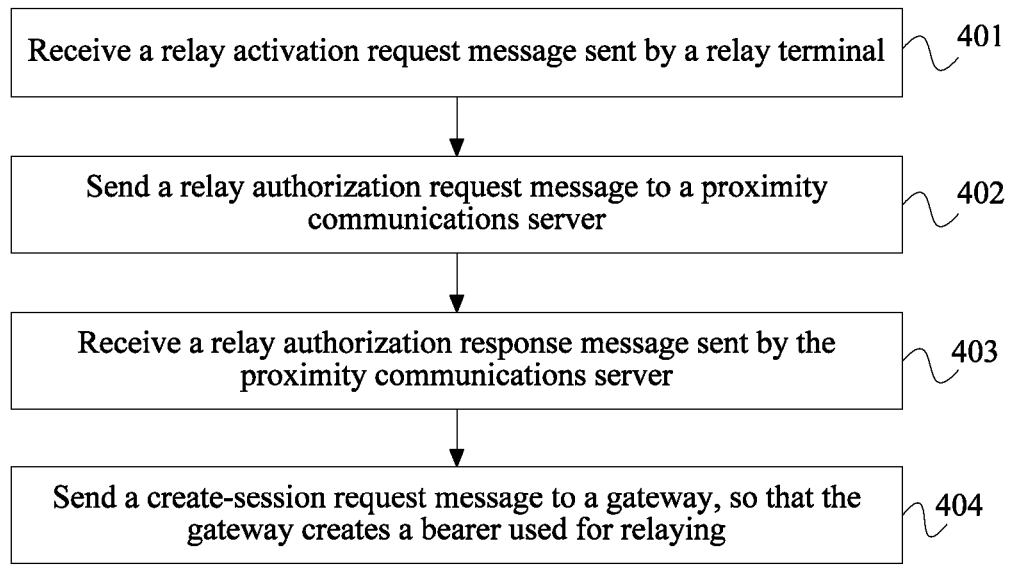
FIG. 5 is a flowchart of Embodiment 4 of a network access method according to the present invention.

FIG. 5 is a flowchart of Embodiment 4 of a network access method according to the present invention. This embodiment is performed by a mobility management entity, and is applicable to a scenario in which some terminals need to perform, when the terminals are out of a mobile communication connection or outside network coverage, network access by using a relay terminal. Specifically, this embodiment includes the following steps:

401. Receive a relay activation request message sent by a relay terminal.

Specifically, after accessing a mobile communications network and when needing to activate a relay function, the relay terminal sends the relay activation request message to the mobility management entity (Mobile Management Entity, MME).

402. Send a relay authorization request message to a proximity communications server.

After receiving the relay activation request message sent by the relay terminal, the MME sends the relay authorization request message to the proximity communications server, so as to request the proximity communications server to authorize the relay activation request of the relay terminal.

403. Receive a relay authorization response message sent by the proximity communications server.

If the proximity communications server authorizes the relay terminal to activate the relay function, the proximity communications server sends the relay authorization response message to the MME, where the response message includes indication information indicating whether the relay terminal can activate the relay function, and the like.

404. Send a create-session request message to a gateway, so that the gateway creates a bearer used for relaying.

The MME sends the create-session request message to the gateway, so as to request the gateway to create, for the relay terminal, a bearer used for relaying. For example, the bearer is a public data network (Public Data Network, PDN) connection. Specifically, the MME may select a gateway that is exclusively used to provide a bearer connection for the relay terminal, the create-session request message carries relay indication information, and the relay indication information notifies the network that the bearer requested to be created is used to provide the relay terminal with a connection required for relaying.

According to the network access method provided in this embodiment of the present invention, an MME receives a relay activation request message sent by a relay terminal that has a relay function, and sends a relay authorization request message to a proximity communications server, so that the proximity communications server determines whether to authorize the relay terminal to activate the relay function. If the proximity communications server authorizes the relay terminal to activate the relay function, a bearer used for relaying is created for the relay terminal after a relay authorization response message is received, which achieves that a trunking communications function can be used normally by means of the relay terminal when some terminals are out of a mobile communication connection or outside network coverage, thereby enhancing communications reliability when a mobile communications network supports the trunking communications function.

Figure 6:
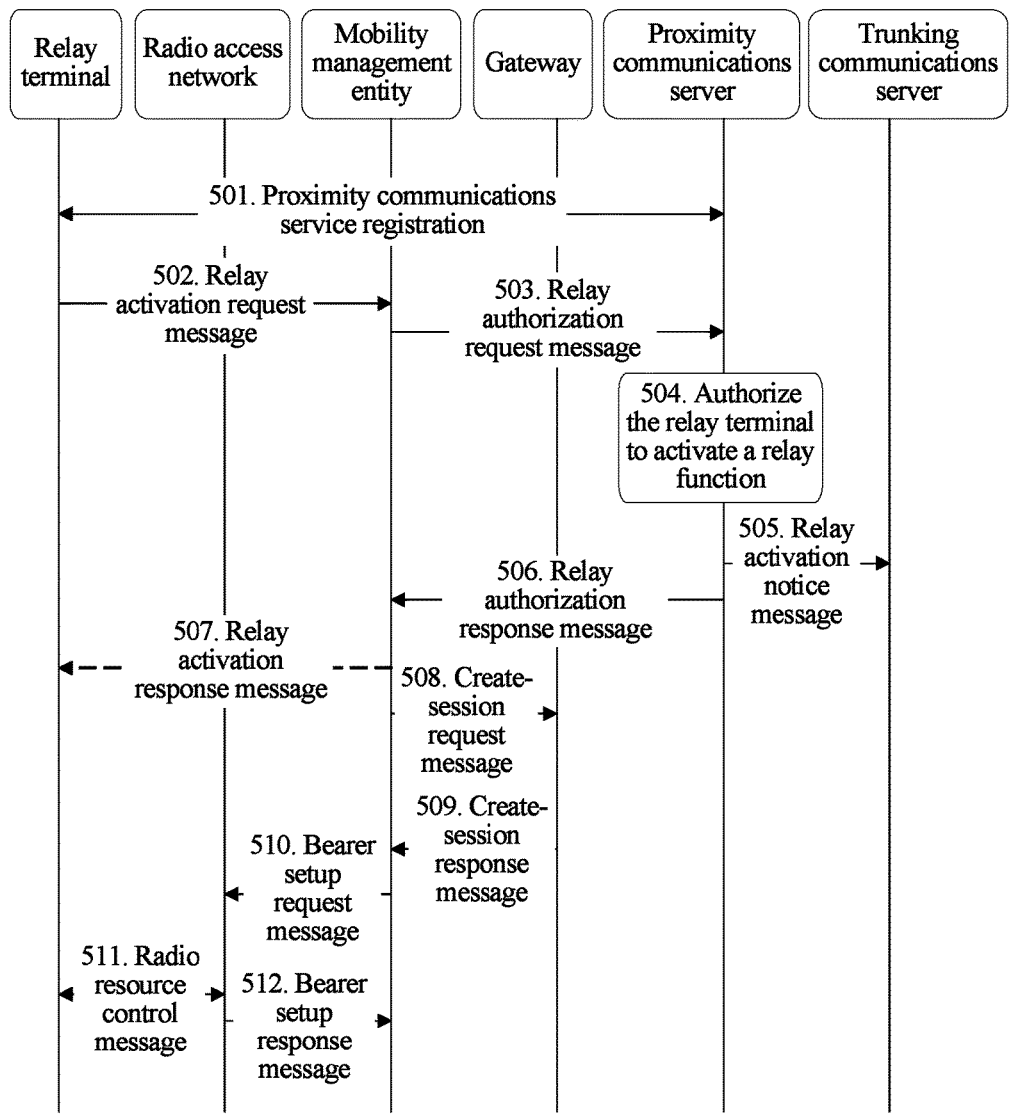
FIG. 6 is a signaling diagram of Embodiment 5 of a network access method according to the present invention.

FIG. 6 is a signaling diagram of Embodiment 5 of a network access method according to the present invention. In this embodiment, a relay terminal requests a network side to activate a relay function. Specifically, this embodiment includes the following steps:

501. The relay terminal finishes registering a proximity communications service.

After accessing a mobile communications network, the relay terminal sends a proximity communications service registration request to a proximity communications server in the mobile communications network, and the proximity communications server verifies whether the terminal can activate the proximity communications service. If the relay terminal can use the proximity communications service, the proximity communications server provides configuration information of the proximity communications service for the relay terminal, where the configuration information includes a proximity terminal identifier (ProSe UE ID) of the relay terminal.

502. The relay terminal sends a relay activation request message to a mobility management entity.

If the relay terminal needs to activate the relay function after accessing the mobile communications network, the relay terminal sends a relay activation request (Relay Activation Request) message to the mobility management entity. Specifically, the relay activation request message may be an extended service request (Extended Service Request) message, where the extended service request message carries relay activation request indication information.

503. The mobility management entity sends a relay authorization request message to a proximity communications server.

After receiving the relay activation request message sent by the relay terminal, the mobility management entity sends the relay authorization request (Relay Authorization Request) message to the proximity communications server, so as to request the proximity communications server to authorize the relay activation request of the relay terminal.

504. The proximity communications server authorizes the relay terminal to activate the relay function.

The proximity communications server determines whether to authorize the relay terminal to activate the relay function. For example, whether the relay terminal supports the relay function may be determined according to a device capability of the relay terminal and the configuration information of the proximity communications service of the relay terminal. Specifically, in step 501, the relay terminal may report its own device capability to the proximity communications server, or the proximity server stores a device capability of each relay terminal, and whether to authorize the relay terminal to activate the relay function is determined according to the device capability.

Optionally, the proximity communications server may determine a trunking communications group (Group) to which the relay terminal belongs, that is, the relay terminal can provide a relay capability for a terminal that belongs to the trunking communications group.

505. The proximity communications server sends a relay activation notice message to a trunking communications server.

After determining whether the relay terminal can activate the relay function, the proximity communications server sends the relay activation notice (Relay Activation Notice) message to the trunking communications server, where the relay activation notice message indicates whether to activate the relay function for the terminal.

Optionally, if the proximity communications server determines the trunking communications group to which the relay terminal belongs, the proximity communications server sends the relay activation notice message to a trunking communications server corresponding to the trunking communications group, so as to notify the trunking communications server that the relay terminal provides the relay function for the terminal in the trunking communications group, where the message includes an identifier of the relay terminal.

Specifically, the proximity communications server may determine, in the following manner, the trunking communications group to which the relay terminal belongs: In a registration process in step 501, the relay terminal may provide the proximity communications server with a group identifier (Group ID) of the trunking communications group to which the relay terminal belongs, and therefore, according to the group identifier, the proximity communications server can determine that the relay terminal provides relaying only for the trunking communications group indicated by the group identifier.

Alternatively, group information of the trunking communications group to which the relay terminal belongs is stored in subscriber subscription data of a home subscriber server (home subscriber server, HSS), and the proximity communications server acquires, from the HSS, the group information of the trunking communications group to which the relay terminal belongs.

506. The proximity communications server sends a relay authorization response message to the mobility management entity.

The relay authorization response (Relay Authorization Response) message includes indication information indicating whether the relay terminal can activate relaying, and a group identifier of a trunking communications group for which the relay terminal can provide the relay function when the relay terminal activates the relay function.

507. The mobility management entity sends a relay activation response message to the relay terminal.

If the relay authorization response message received by the mobility management entity in step 506 indicates that the relay terminal is not allowed to activate the relay function, the mobility management entity sends the relay activation response message to the relay terminal, where the message includes indication information indicating that the relay terminal is disallowed to activate the relay function. This step is an optional step.

508. The mobility management entity sends a create-session request message to a gateway.

If the relay authorization response message received by the mobility management entity in step 506 indicates that the relay terminal is allowed to activate the relay function, the mobility management entity sends the create-session request (Create Session Request) message to the gateway, so as to request the gateway to create a public data network (Public Data Network, PDN) connection for the relay terminal, where the PDN connection is used for relaying and may also be called a bearer used for relaying.

Specifically, the mobility management entity may select a gateway that is exclusively used to provide a bearer connection for the relay terminal, the create-session request message includes relay indication (Relay Indication) information, and the relay indication information notifies the gateway that the bearer requested to be created is used to provide the relay terminal with a connection required for relaying.

509. The gateway sends a create-session response message to the mobility management entity.

The gateway creates a bearer according to the create-session request message sent by the mobility management entity, where a context of the bearer stores relay indication information; and then sends the create-session response (Create Session Response) message to the mobility management entity to notify the mobility management entity that the bearer has already been created, where the create-session response message includes information about the created bearer.

510. The mobility management entity sends a bearer setup request message to a radio access network.

The mobility management entity sends the bearer setup request (Bearer Setup Request/Relay Activation Accept) message to the radio access network, where the message includes the information about the created bearer, the relay indication information, and a group identifier of a trunking communications group that allows the relay terminal to provide relaying. The bearer information includes an identifier of the bearer, a quality of service (Quality of service, QoS) parameter of the bearer, and the like.

511. The radio access network sends a radio resource control message to the relay terminal.

The radio access network further adds, to the radio resource control (Radio Resource Control, RRC) message such as an RRC reconfiguration message, the information about the created bearer, the relay indication information, the group identifier, and the like that are received from the mobility management entity in step 510, and sends the message to the relay terminal. After receiving the relay indication information, the relay terminal activates the relay function, and provides relaying for a terminal in the trunking communications group corresponding to the group identifier.

Further, the radio access network may allocate, to the relay terminal, a radio resource (Radio Resource) used for relaying, where the radio resource may be a spectrum or a channel that is allowed to be used when the relay terminal performs the relay function, or power control information, or the like. In addition, the radio resource further includes radio resource information used to indicate a radio resource used for the relay terminal and the terminal to establish a connection in a proximity manner. The radio access network adds the radio resource information to the radio resource control (Radio Resource Control, RRC) message such as an RRC reconfiguration message, and sends the message to the relay terminal, where the radio access network may be a base station (eNodeB) or the like.

512. The radio access network sends a bearer setup response message to the mobility management entity.

The radio access network sends the bearer setup response (Bearer Context Response) message to the mobility management entity, and notifies the mobility management entity that the relay terminal has been provided with the information about the created bearer, the relay indication information, the group identifier, and the like.

Figure 7:
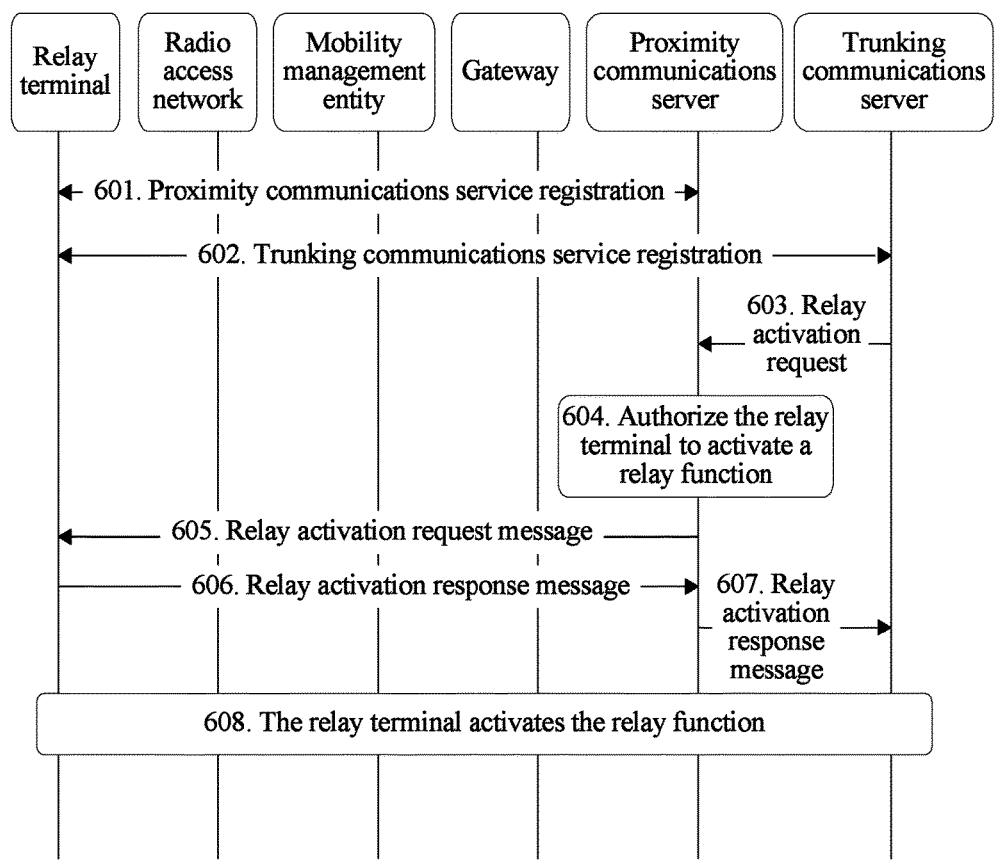
FIG. 7 is a signaling diagram of Embodiment 6 of a network access method according to the present invention.

FIG. 7 is a signaling diagram of Embodiment 6 of a network access method according to the present invention. In this embodiment, a network side instructs a relay terminal to activate a relay function. Specifically, this embodiment includes the following steps:

601. The relay terminal finishes registering a proximity communications service.

For details, reference may be made to step 501 in FIG. 6, and details are not described herein again.

602. The relay terminal finishes registering a trunking communications service.

The relay terminal activates a trunking communications function of a group. That is, the relay terminal joins a specific trunking communications group.

Specifically, the relay terminal sends a registration request to a trunking communications server corresponding to a trunking communications group that the relay terminal intends to join, where the registration request includes a proximity terminal identifier (ProSe UE ID) of the relay terminal. The trunking communications server verifies the registration request, and establishes a trunking communication connection such as an MBMS broadcast communication connection to the relay terminal after the relay terminal is allowed to join the trunking communications group.

603. A trunking communications server sends a relay activation request to a proximity communications server.

When determining that the relay terminal needs to activate the relay function, the trunking communications server sends the relay activation request to the proximity communications server, where the relay activation request includes the proximity terminal identifier (ProSe UE ID) of the terminal.

604. The proximity communications server authorizes the relay terminal to activate the relay function.

For details, reference may be made to step 504 in FIG. 6, and details are not described herein again.

605. The proximity communications server sends a relay activation request message to the relay terminal.

If the relay terminal is authorized to activate the relay function in step 604, the relay activation request (Relay Activation Request) message is sent to the relay terminal to instruct the relay terminal to activate the relay function.

606. The relay terminal sends a relay activation response message to the proximity communications server.

After receiving the relay activation request message sent by the proximity communications server, the relay terminal confirms that the relay function can be activated, and sends the relay activation response (Relay Activation Response) message to the proximity communications server.

607. The proximity communications server sends the relay activation response message to the trunking communications server.

The proximity communications server sends the relay activation response message to the trunking communications server to notify the trunking communications server that the relay terminal can activate the relay function.

608. The relay terminal activates the relay function.

In this step, because a bearer, a radio resource, and the like that are required for activating the relay function are also allocated to the relay terminal, the relay terminal performs steps 502 to 512 in FIG. 6 to implement preparatory work for relay activation, and activates the relay function.

FIG. 6 and FIG. 7 describe the embodiments of the present invention in detail from a perspective regarding how the relay terminal activates the relay function, and the following describes the present invention in detail from a perspective regarding how a terminal performs network access by using a relay terminal.

Figure 8:
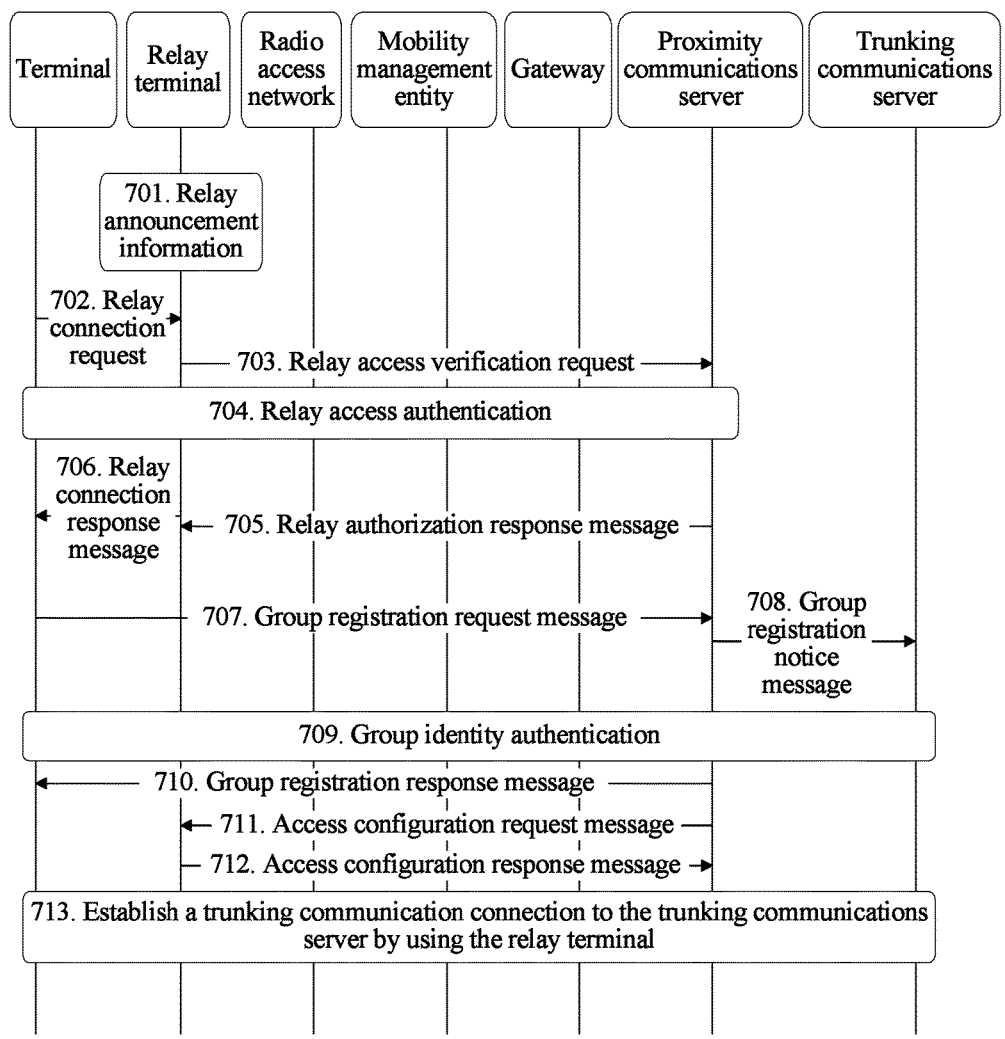
FIG. 8 is a signaling diagram of Embodiment 7 of a network access method according to the present invention.

FIG. 8 is a signaling diagram of Embodiment 7 of a network access method according to the present invention. In this embodiment, a terminal that is out of a mobile communication connection or outside network coverage performs network access by using a relay terminal. Specifically, this embodiment includes the following steps:

701. The relay terminal sends relay announcement information.

After activating a relay function, the relay terminal sends the relay announcement (Relay Announcement) information in a manner such as a proximity broadcast signal, so as to notify another terminal that the relay terminal may support the relay function and can provide network access for the another terminal.

Optionally, if the relay terminal can provide relaying only for a trunking communications group or a known quantity of trunking communications groups, the relay terminal may add group identifiers of the trunking communications groups to the relay announcement information.

702. The terminal sends a relay connection request to the relay terminal.

When a terminal outside network coverage needs to access a mobile communications network, the terminal detects surrounding relay announcement information. When determining that an available relay terminal exists around, the terminal sends the relay connection request (Relay Connection Request) to the determined relay terminal, where the request includes an identifier of the terminal, for example, a proximity terminal identity (ProSe UE ID) or an international mobile subscriber identity (International Mobile Subscriber Identity, IMSI). The specific proximity terminal identifier may be allocated by a network such as a proximity server, and be configured on the terminal.

703. The relay terminal sends a relay access verification request to a proximity communications server.

After receiving the relay connection request sent by the terminal, the relay terminal sends the relay access verification request (Relay Authorization Request) to the proximity communications server, so as to request the proximity communications server to verify whether the terminal is authorized to access the network in a relay access manner, where the relay access verification request carries the identifier of the terminal and the like.

704. Perform relay access authentication between the proximity server and the terminal.

Relay access authentication (Relay Authentication Procedure) is performed between the proximity communications server and the terminal, and the relay terminal transmits a relay access authentication message related to the authentication between the proximity server and the terminal. The relay access authentication may be identity authentication of both parties performed by using a preconfigured key, and the like. For example, an identity authentication key for relay access is preconfigured on the terminal.

705. The proximity communications server sends a relay authorization response message to the relay terminal.

After performing the relay access authentication with the terminal, the proximity communications server sends the relay authorization response (Relay Authorization Response) message to the relay terminal, so as to notify the relay terminal whether the terminal can perform network access in a relay manner, where the relay authorization response message includes indication information indicating whether the terminal is allowed for accessing.

706. The relay terminal sends a relay connection response message to the terminal.

The relay terminal sends the relay connection response message to the terminal, so as to notify whether the terminal can perform network access in the relay access manner. Specifically, if the terminal fails in the relay access authentication, the terminal is disallowed to perform network access in the relay manner; if the terminal succeeds in the relay access authentication, the relay terminal allocates a network address such as an IP V6 or IP V4 address to the terminal.

Generally, the terminal is allowed to perform network access in the relay manner for a primary purpose of implementing trunking communication. Therefore, the relay terminal restricts a network accessible by the terminal, so as to avoid that load and security of the network and load and security of the relay terminal are affected because the terminal can access any network address. That is, the relay terminal allocates, to the terminal, only a network address that the terminal is allowed to access, and the network address that the terminal is allowed to access may be determined by the proximity communications server. For example, when the terminal is allowed to perform network access only in the relay manner and has not joined a trunking communications group, the network address that the terminal is allowed to access may be preset, or a network address of a specified trunking communications server is allocated to the terminal.

707. The terminal sends a group registration request message to the proximity communications server.

When the terminal needs to join a trunking communications group, the terminal sends the group registration request (Group Registration Request) message to the proximity communications server, where the message includes a group identifier of a trunking communications group that the terminal intends to join and the identifier of the terminal, for example, an international mobile subscriber identity (International Mobile Subscriber Identity, IMSI), a group member identifier (Group Member ID) of the terminal, and the like.

708. The proximity communications server sends a group registration notice message to a trunking communications server.

The proximity communications server sends the group registration notice (Group Registration Notice) message to a trunking communications server corresponding to the trunking communications group indicated by the group identifier, where the notice message carries the group member identifier of the terminal.

709. Perform group identity authentication between the trunking communications server and the terminal.

The trunking communications server and the terminal perform group identity authentication (Group Authentication Procedure), namely, verify whether the terminal can join the trunking communications group corresponding to the trunking communications server. For example, preconfigured group authentication information may be used to verify whether the terminal can join the corresponding trunking communications group. Specifically, the group authentication information may include a group authentication key, an authentication algorithm, and the like, and the proximity communications server transmits an authentication message of group identity authentication performed between the terminal and the trunking communications server.

710. The proximity communications server sends a group registration response message to the terminal.

After completion of the group identity authentication, the proximity communications server sends the group registration response (Group Registration Response) message to the terminal, where the response message includes indication information indicating whether the terminal succeeds in the group identity authentication. Specifically, the trunking communications server sends a result of success or failure of the group identity authentication to the proximity communications server, and the proximity communications server notifies the terminal whether the terminal succeeds in the group identity authentication. If the indication information indicates that the terminal succeeds in the group identity authentication, step 711 is performed; if the indication information indicates that the terminal fails in the group identity authentication, the terminal is disallowed to perform network access in the relay manner.

711. The proximity communications server sends an access configuration request message to the relay terminal.

If the terminal succeeds in the group identity authentication, the proximity communications server sends the access configuration request (Access Configuration Request) message to the relay terminal, so as to notify the relay terminal of a network address accessible by the terminal, where the network address includes but is not limited to a network address of the trunking communications server.

Specifically, the proximity communications server may send, to the relay terminal, the identifier of the terminal and the network address that the terminal is allowed to access, where the network address that the terminal is allowed to access includes but is not limited to the network address of the trunking communications server. The relay terminal stores the access configuration request message that carries the identifier of the terminal, the network addresses that the terminal is allowed to access, and the like, and controls a network access behavior of the terminal according to the access configuration request message, for example, the terminal is allowed to access an accessible network. Alternatively, if the relay terminal stores group information that includes a correspondence between the group identifier and the network address of the trunking communications server, the proximity communications server may add, to the access configuration request message, the terminal identifier of the terminal and the group identifier of the trunking communications group to which the terminal belongs, and send the message to the relay terminal, so that the relay terminal acquires, according to the group identifier, the network address of the trunking communications server corresponding to the group identifier and controls the network access behavior of the terminal.

712. The relay terminal sends an access configuration response message to the terminal.

Relative to step 706, if the network address allocated in step 711 is different from the network address in step 706, the relay terminal updates the network address accessible by the terminal, and sends the access configuration response (Access Configuration Response) message to the proximity communications server.

713. The terminal establishes a trunking communication connection to the trunking communications server by using the relay terminal.

A terminal that is outside network coverage and used for trunking communications accesses a mobile communications network, and further accesses a trunking communications server, and therefore, it is achieved that a trunking communications function can be used normally when some terminals are out of a mobile communication connection or outside network coverage in a trunking communications application, thereby enhancing communications reliability when the mobile communications network supports the trunking communications function.

It should be noted that when a terminal belongs to multiple trunking communications groups, if the terminal needs to join some of the trunking communications groups, a process of joining each trunking communications group may be performed according to steps 707 to 713 in this embodiment.

Figure 9:
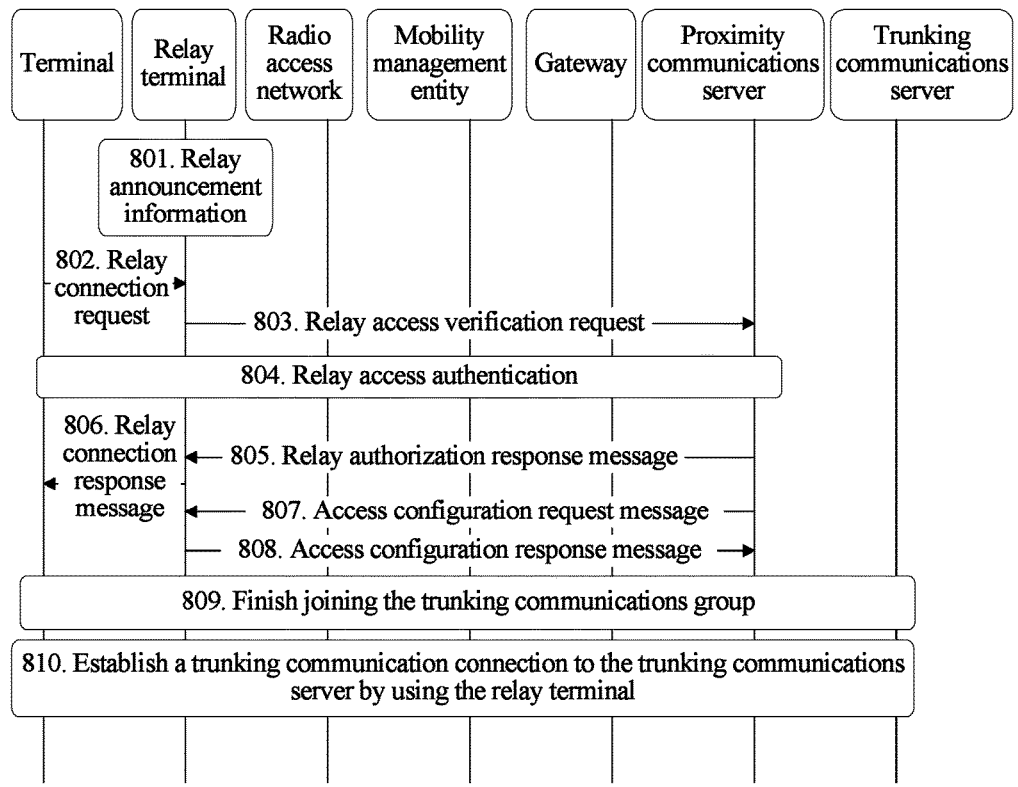
FIG. 9 is a signaling diagram of Embodiment 8 of a network access method according to the present invention.

FIG. 9 is a signaling diagram of Embodiment 8 of a network access method according to the present invention. This embodiment differs from Embodiment 7 in FIG. 8 in that: In FIG. 8, a terminal intends to join a trunking communications group, so that a proximity communications server acquires, according to a group identifier sent by the terminal, a network address that the terminal is allowed to access; in this embodiment, however, the proximity communications server proactively acquires a network address of a trunking communications server corresponding to a trunking communications group to which the terminal belongs. Specifically, this embodiment includes the following steps:

801. A relay terminal sends relay announcement information.

802. A terminal sends a relay connection request to the relay terminal.

803. The relay terminal sends a relay access verification request to a proximity communications server.

804. Perform relay access authentication between the proximity server and the terminal.

805. The proximity communications server sends a relay authorization response message to the relay terminal.

806. The relay terminal sends a relay connection response message to the terminal.

For details of steps 801 to 806, reference may be made to steps 701 to 706 in FIG. 8, and details are not described herein again.

807. The proximity communications server sends an access configuration request message to the relay terminal.

The proximity communications server acquires group information of the trunking communications group to which the terminal belongs when learning that the terminal can perform network access in a relay manner, and further acquires a network address of the trunking communications server corresponding to the trunking communications group, adds the acquired network address to the access configuration request (Access Configuration Request) message, and sends the message to the relay terminal. The following manners may be used by the proximity communications server to acquire the group information of the trunking communications group to which the terminal belongs:

The proximity communications server acquires, from subscription data of the terminal that is stored in a home subscriber server (Home Subscriber Server, HSS), group information that includes a correspondence between the group identifier and the network address of the trunking communications server, adds the acquired group information to the access configuration request message, and sends the message to the relay terminal, where the group information may include the network address of the trunking communications server. In addition, the proximity communications server may also store the correspondence between the group identifier and the network address of the trunking communications server, the HSS stores a group identifier of a trunking communications group to which the relay terminal belongs, and after acquiring the group identifier from the HSS, the proximity communications server acquires the network address locally according to the group identifier, thereby obtaining the group information (including the group identifier and the network address of the corresponding trunking communications server) of the group information of the group communication server to which the terminal belongs.

Further, in this manner, if the terminal belongs to multiple trunking communications groups, the proximity communications server may send, to the relay terminal, an identifier of the terminal and network addresses of trunking communications servers corresponding to the multiple trunking communications groups, where the terminal is allowed to access the network addresses.

In addition, the relay terminal may receive and store in advance group information sent by the proximity communications server, where the group information carries the correspondence between the group identifier and the network address; or pre-store preset group information. In this case, the proximity communications server needs to send, only to the relay terminal, a terminal identifier of the terminal and an identifier of the trunking communications group to which the terminal belongs, and the relay terminal acquires the corresponding network address from the locally stored group information, and allocates the network address to the terminal.

808. The relay terminal sends an access configuration response message to the proximity communications server.

Relative to step 806, if the network address allocated in step 808 is different from the network address in step 806, the relay terminal updates the network address accessible by the terminal, and sends the access configuration response (Access Configuration Response) message to the proximity communications server.

809. The terminal finishes joining the trunking communications group.

When the terminal needs to join the trunking communications group to which the terminal belongs, the terminal sends a group registration request message to the trunking communications server corresponding to the trunking communications group. For details of a group registration process performed between the terminal and the trunking communications server, reference may be made to steps 709 and 710 in FIG. 8, and details are not described herein again.

810. The terminal establishes a trunking communication connection to the trunking communications server by using the relay terminal.

For details, reference may be made to step 713 in FIG. 8, and details are not described herein again.

Figure 10:
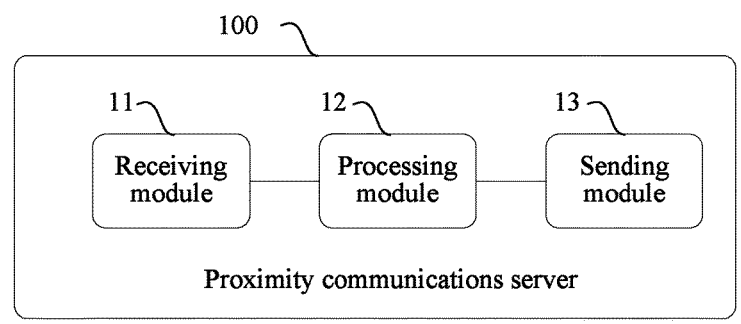
FIG. 10 is a schematic structural diagram of Embodiment 1 of a proximity communications server according to the present invention.

FIG. 10 is a schematic structural diagram of Embodiment 1 of a proximity communications server according to the present invention. The proximity communications server provided in this embodiment is an apparatus embodiment corresponding to the embodiment in FIG. 2 of the present invention, and a specific implementation process is not described herein again. Specifically, the proximity communications server 100 provided in this embodiment specifically includes:

a receiving module 11, configured to receive a relay access verification request sent by a relay terminal, where the relay access verification request is sent by the relay terminal after a relay connection request sent by a terminal is received;

a processing module 12, configured to verify, according to the relay access verification request received by the receiving module 11, whether the terminal is authorized to perform network access by using the relay terminal; and a sending module 13, configured to send a relay authorization response message to the relay terminal, where the relay authorization response message carries indication information indicating whether the terminal is allowed to perform network access by using the relay terminal.

The proximity communications server provided in this embodiment of the present invention verifies whether a terminal is authorized to perform network access in a relay manner, so as to achieve that a trunking communications function can be used normally by means of a relay terminal when some terminals are out of a mobile communication connection or outside network coverage, thereby enhancing communications reliability when a mobile communications network supports the trunking communications function.

Further, the sending module 13 is further configured to send, to the relay terminal, at least one network address that the terminal is allowed to access, so that the relay terminal allocates a network address to the terminal.

Further, the at least one network address includes:

a network address of a trunking communications server, where the trunking communications server is a trunking communications server corresponding to a trunking communications group to which the terminal belongs, and there is at least one trunking communications server.

Further, the processing module 12 is configured to acquire, from a home subscriber server, group information of the trunking communications group to which the terminal belongs, and acquire the network address of the trunking communications server from the group information.

Further, the at least one network address includes:

a network address of a trunking communications server corresponding to a trunking communications group that the terminal is allowed to join, where there is at least one trunking communications group that the terminal is allowed to join.

Further, the receiving module 11 is configured to receive a group registration request message sent by the terminal, where the group registration request message carries a group identifier of a trunking communications group that the terminal intends to join;

the sending module 13 is configured to: if the processing module 12 authorizes the terminal to perform network access by using the relay terminal, send a group registration notice message to a trunking communications server indicated by the group identifier, so that the trunking communications server verifies whether the terminal is authorized to join the trunking communications group; and the sending module 13 is further configured to send a group registration response message to the terminal, where the group registration response message carries verification information indicating whether the trunking communications server authorizes the terminal to join the trunking communications group.

Further, the sending module 13 is further configured to send, to the relay terminal, a terminal identifier of the terminal and a group identifier of a trunking communications group to which the terminal belongs, so that the relay terminal acquires, according to the group identifier, a network address corresponding to the group identifier.

Further, the sending module 13 is further configured to send, to the relay terminal, group information that carries a correspondence between the group identifier and the network address.

Further, the processing module 12 is further configured to authorize the relay terminal to activate a relay function.

Further, the receiving module 11 is configured to receive a relay authorization request message sent by a mobility management entity, where the relay authorization request message is sent after the mobility management entity receives a relay activation request message sent by the relay terminal; and the sending module 13 is configured to: if the relay terminal can activate the relay function, send the relay authorization response message to the mobility management entity, so that the mobility management entity instructs the relay terminal to activate the relay function.

Further, the receiving module 11 is configured to receive a relay activation request sent by the trunking communications server, where the trunking communications server is a trunking communications server corresponding to a trunking communications group to which the relay terminal belongs; and the sending module 13 is configured to send a relay activation response message to the trunking communications server if the relay terminal can activate the relay function.

Figure 11:
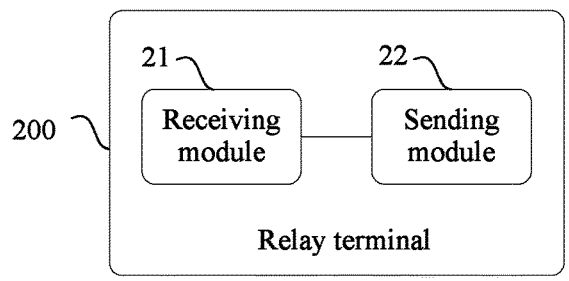
FIG. 11 is a schematic structural diagram of Embodiment 1 of a relay terminal according to the present invention.

FIG. 11 is a schematic structural diagram of Embodiment 1 of a relay terminal according to the present invention. The relay terminal provided in this embodiment is an apparatus embodiment corresponding to the embodiment in FIG. 3 of the present invention, and a specific implementation process is not described herein again. Specifically, the relay terminal 200 provided in this embodiment specifically includes:

a receiving module 21, configured to receive a relay connection request sent by a terminal; and a sending module 22, configured to send a relay access verification request to a proximity communications server, so that the proximity communications server verifies whether the terminal is authorized to perform network access in a relay manner, where the receiving module 21 is further configured to receive a relay authorization response message sent by the proximity communications server, where the relay authorization response message carries indication information indicating whether the terminal is allowed to perform network access in the relay manner.

The relay terminal provided in this embodiment of the present invention sends a relay access verification request to a proximity server, so that the proximity server verifies whether a terminal is authorized to perform network access in a relay manner. Therefore, it is achieved that a trunking communications function can be used normally by means of the relay terminal when some terminals are out of a mobile communication connection or outside network coverage, thereby enhancing communications reliability when a mobile communications network supports the trunking communications function.

Figure 12:
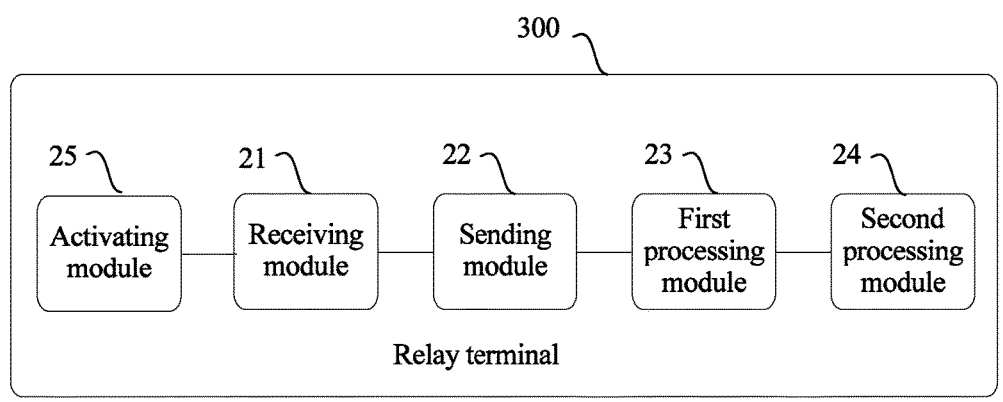
FIG. 12 is a schematic structural diagram of Embodiment 2 of a relay terminal according to the present invention.

FIG. 12 is a schematic structural diagram of Embodiment 2 of a relay terminal according to the present invention. As shown in FIG. 12, on the basis of the apparatus structure in FIG. 11, the relay terminal 300 provided in this embodiment further includes a first processing module 23;

the receiving module 21 is configured to receive at least one network address that the terminal is allowed to access and that is sent by the proximity communications server; and the first processing module 23 is configured to allocate a network address to the terminal.

Referring to FIG. 12 again, further, the relay terminal 300 further includes a second processing module 24;

the receiving module 21 is configured to receive a terminal identifier of the terminal and a group identifier of a trunking communications group to which the terminal belongs, where the terminal identifier and the group identifier are sent by the proximity communications server; and the second processing module 24 is configured to acquire, according to the group identifier, a network address of a trunking communications server corresponding to the group identifier, and allocate the acquired network address to the terminal.

Further, the receiving module 21 is configured to receive group information sent by the proximity communications server, where the group information carries a correspondence between the group identifier and the network address of the trunking communications server.

Referring to FIG. 12 again, further, the relay terminal 300 further includes:

an activating module 25, configured to activate a relay function.

Further, the sending module 22 is configured to send a relay activation request message to a mobility management entity, so that the mobility management entity sends a relay authorization request message to the proximity communications server, and the proximity communications server authorizes activation of the relay function; and the receiving module 21 is configured to receive a relay authorization activation message sent by the mobility management entity.

Further, the sending module 22 is configured to send a registration request to the trunking communications server, so as to join a trunking communications group corresponding to the trunking communications server;

the receiving module 21 is configured to receive a relay activation request sent by the proximity communications server; and the sending module 22 is further configured to send a relay activation response message to the proximity communications server.

Figure 13:
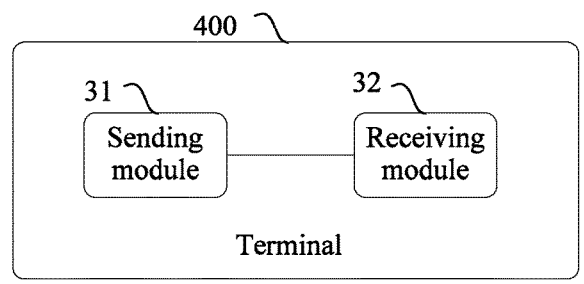
FIG. 13 is a schematic structural diagram of Embodiment 1 of a terminal according to the present invention.

FIG. 13 is a schematic structural diagram of Embodiment 1 of a terminal according to the present invention. The terminal provided in this embodiment is an apparatus embodiment corresponding to the embodiment in FIG. 4 of the present invention, and a specific implementation process is not described herein again. Specifically, the terminal 400 provided in this embodiment specifically includes:

a sending module 31, configured to send a relay connection request to a relay terminal, so as to request to perform network access by using the relay terminal; and a receiving module 32, configured to receive a relay connection response message sent by the relay terminal, where the relay connection response message is sent by the relay terminal after a relay authorization response message sent by a proximity communications server is received, and the relay connection response message carries indication information indicating whether network access can be performed by using the relay terminal.

According to the terminal provided in this embodiment of the present invention, when the terminal is out of a communication connection or moves out of network coverage, the terminal sends a relay connection request to a relay terminal, and the relay terminal sends a relay access verification request to a proximity server, so that the proximity server verifies whether the terminal is authorized to perform network access in a relay manner. Therefore, it is achieved that a trunking communications function can be used normally by means of the relay terminal when some terminals are out of a mobile communication connection or outside network coverage, thereby enhancing communications reliability when a mobile communications network supports the trunking communications function.

Figure 14:
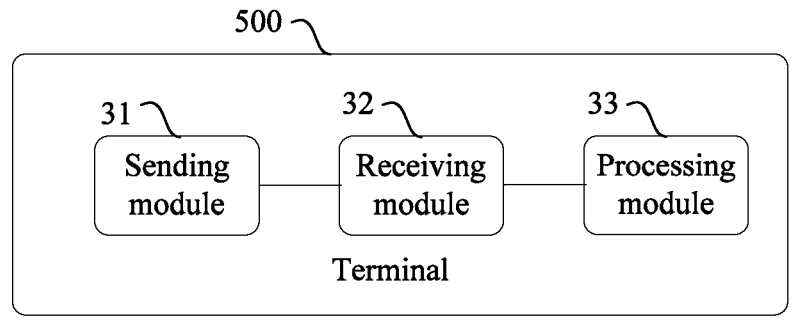
FIG. 14 is a schematic structural diagram of Embodiment 2 of a terminal according to the present invention.

FIG. 14 is a schematic structural diagram of Embodiment 2 of a terminal according to the present invention. As shown in FIG. 14, on the basis of the apparatus structure in FIG. 13, the terminal 500 provided in this embodiment further includes a processing module 33;

the receiving module 32 is configured to receive a network address allocated by the relay terminal; and the processing module 33 is configured to perform network access according to the network address.

Figure 15:
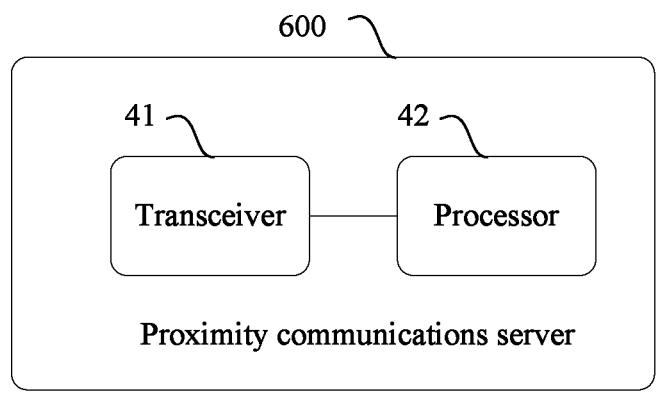
FIG. 15 is a schematic structural diagram of Embodiment 2 of a proximity communications server according to the present invention.

FIG. 15 is a schematic structural diagram of Embodiment 2 of a proximity communications server according to the present invention. The proximity communications server provided in this embodiment may specifically implement various steps of a method that is applied to the proximity communications server and that is provided in any embodiment of the present invention, and a specific implementation process is not described herein again. As shown in FIG. 15, the proximity communications server 600 provided in this embodiment includes:

a transceiver 41, configured to communicate with a trunking communications server, a terminal, and another network element in a communications network; and a processor 42, configured to control the transceiver 41 to receive a relay access verification request sent by a relay terminal, where the relay access verification request is sent by the relay terminal after a relay connection request sent by a terminal is received, where the processor 42 is further configured to verify, according to the relay access verification request received by the transceiver 41, whether the terminal is authorized to perform network access by using the relay terminal; and the processor 42 is further configured to control the transceiver 41 to send a relay authorization response message to the relay terminal, where the relay authorization response message carries indication information indicating whether the terminal is allowed to perform network access by using the relay terminal.

For a working process and the like of each component of the proximity communications server provided in this embodiment, refer to the proximity communications server shown in FIG. 10; the proximity communications server may be used to implement the technical solution of the method embodiment shown in FIG. 2, and implementation principles thereof are similar and are not described herein again.

Figure 16:
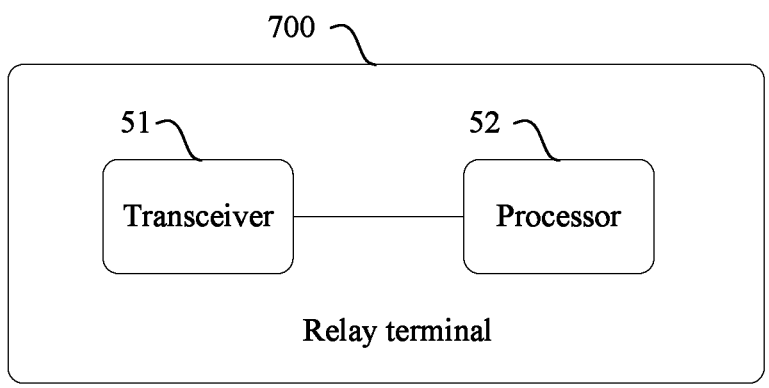
FIG. 16 is a schematic structural diagram of Embodiment 3 of a relay terminal according to the present invention.

FIG. 16 is a schematic structural diagram of Embodiment 3 of a relay terminal according to the present invention. The relay terminal provided in this embodiment may specifically implement various steps of a method that is applied to the relay terminal and that is provided in any embodiment of the present invention, and a specific implementation process is not described herein again. As shown in FIG. 16, the relay terminal 700 provided in this embodiment includes:

a transceiver 51, configured to communicate with another network element in a communications network and a terminal; and a processor 52, configured to control the transceiver 51 to receive a relay connection request sent by the terminal, and send a relay access verification request to a proximity communications server, so that the proximity communications server verifies whether the terminal is authorized to perform network access in a relay manner, where the processor 52 is further configured to control the transceiver 51 to receive a relay authorization response message sent by the proximity communications server, where the relay authorization response message carries indication information indicating whether the terminal is allowed to perform network access in the relay manner.

For a working process and the like of each component of the relay terminal provided in this embodiment, refer to the relay terminal shown in FIG. 11 or FIG. 12; the relay terminal may be used to implement the technical solution of the method embodiment shown in FIG. 3, and implementation principles thereof are similar and are not described herein again.

Figure 17:
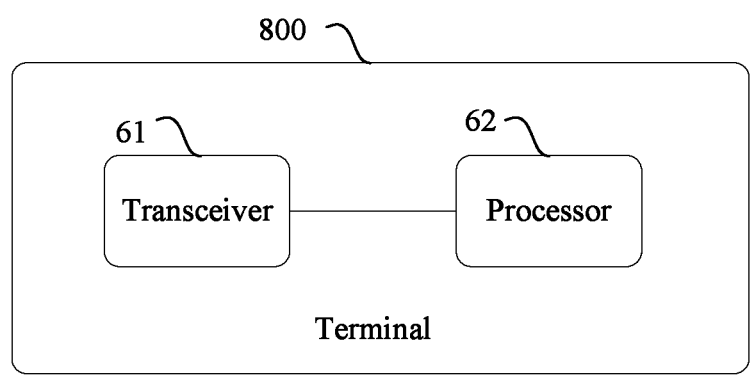
FIG. 17 is a schematic structural diagram of Embodiment 3 of a terminal according to the present invention.

FIG. 17 is a schematic structural diagram of Embodiment 3 of a terminal according to the present invention. The terminal provided in this embodiment may specifically implement various steps of a method that is applied to the terminal and provided in any embodiment of the present invention, and a specific implementation process is not described herein again. As shown in FIG. 17, the terminal 800 provided in this embodiment includes:

a transceiver 61, configured to communicate with a relay terminal and another network element in a communications network; and a processor 62, configured to control the transceiver 61 to send a relay connection request to the relay terminal, so as to request to perform network access by using the relay terminal, where the processor 62 is further configured to control the transceiver 61 to receive a relay connection response message sent by the relay terminal, where the relay connection response message is sent by the relay terminal after a relay authorization response message sent by a proximity communications server is received, and the relay connection response message carries indication information indicating whether network access can be performed by using the relay terminal.

For a working process and the like of each component of the terminal provided in this embodiment, refer to the terminal shown in FIG. 13 or FIG. 14; the terminal may be used to implement the technical solution of the method embodiment shown in FIG. 4, and implementation principles thereof are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network access method, comprising:
receiving, by a proximity communications server, a relay access verification request from a relay terminal, wherein the relay access verification request corresponds to a trunking communication request from a terminal;
verifying, by the proximity communications server, based on the relay access verification request, that the terminal is authorized to perform network access using the relay terminal;
authorizing, by the proximity communications server, the relay terminal to activate a relay function by sending a relay authorization response message to the relay terminal, wherein the relay authorization response message carries indication information indicating that the terminal is allowed to perform network access via trunking communications using the relay terminal;
acquiring, from a home subscriber server, group information of a trunking communications group to which the terminal belongs;
acquiring a network address of a trunking communications server that the terminal is allowed to access according to the group information; and
sending, to the relay terminal, the network address.

2. The method according to claim 1, further comprising:
sending, to the relay terminal, a terminal identifier of the terminal and a group identifier of the trunking communications group.

3. The method according to claim 2, comprising:
sending, to the relay terminal, group information that carries a correspondence between the group identifier and the network address.

4. A network access method, comprising:
receiving, by a proximity communications server, a relay access verification request from a relay terminal, wherein the relay access verification request corresponds to a trunking communication request from a terminal;
verifying, by the proximity communications server, based on the relay access verification request, that the terminal is authorized to perform network access using the relay terminal;
authorizing, by the proximity communications server, the relay terminal to activate a relay function by sending a relay authorization response message to the relay terminal, wherein the relay authorization response message carries indication information indicating that the terminal is allowed to perform network access via trunking communications using the relay terminal;
receiving a group registration request message from the terminal, wherein the group registration request message carries a group identifier of a trunking communications group that the terminal intends to join;
sending a group registration notice message to a trunking communications server indicated by the group identifier for verification of whether the terminal is authorized to join the trunking communications group by the trunking communications server;
sending a group registration response message to the terminal, wherein the group registration response message carries verification information indicating that the trunking communications server authorizes the terminal to join the trunking communications group; and
sending, to the relay terminal, a network address of the trunking communications server.

5. The method according to claim 4, further comprising:
sending, to the relay terminal, a terminal identifier of the terminal and the group identifier of the trunking communications group.

6. The method according to claim 5, further comprising:
sending, to the relay terminal, group information that carries a correspondence between the group identifier and the network address.

7. A proximity communications server, comprising a processor and a non-transitory computer-readable medium having processor-executable instructions stored thereon, wherein the processor-executable instructions, when executed by the processor, facilitate the following:
receiving a relay access verification request from a relay terminal, wherein the relay access verification request corresponds to a trunking communication request from a terminal;
verifying, according to the relay access verification request, that the terminal is authorized to perform network access using the relay terminal;
authorizing the relay terminal to activate a relay function by sending a relay authorization response message to the relay terminal, wherein the relay authorization response message carries indication information indicating that the terminal is allowed to perform network access via trunking communications using the relay terminal;
acquiring, from a home subscriber server, group information of a trunking communications group to which the terminal belongs;
acquiring a network address of a trunking communications server that the terminal is allowed to access according to the group information; and
sending, to the relay terminal, the network address.

8. The proximity communications server according to claim 7, wherein execution of the processor-executable instructions further facilitates:
sending, to the relay terminal, a terminal identifier of the terminal and a group identifier of the trunking communications group.

9. The proximity communications server according to claim 8, wherein execution of the processor-executable instructions further facilitates:
sending, to the relay terminal, group information that carries a correspondence between the group identifier and the network address.

10. A proximity communications server, comprising a processor and a non-transitory computer-readable medium having processor-executable instructions stored thereon, wherein the processor-executable instructions, when executed by the processor, facilitate the following:
receiving a relay access verification request from a relay terminal, wherein the relay access verification request corresponds to a trunking communication request from a terminal;
verifying, according to the relay access verification request, that the terminal is authorized to perform network access using the relay terminal;
authorizing the relay terminal to activate a relay function by sending a relay authorization response message to the relay terminal, wherein the relay authorization response message carries indication information indicating that the terminal is allowed to perform network access via trunking communications using the relay terminal;

receiving a group registration request message from the terminal, wherein the group registration request message carries a group identifier of a trunking communications group that the terminal intends to join;

sending a group registration notice message to a trunking communications server indicated by the group identifier for verification of whether the terminal is authorized to join the trunking communications group by the trunking communications server;

sending a group registration response message to the terminal, wherein the group registration response message carries verification information indicating that the trunking communications server authorizes the terminal to join the trunking communications group; and sending, to the relay terminal a network address of the trunking communications server.

11. The proximity communications server according to claim 10, wherein execution of the processor-executable instructions further facilitates:

sending, to the relay terminal, a terminal identifier of the terminal and the group identifier of the trunking communications group.

12. The proximity communications server according to claim 11, wherein execution of the processor-executable instructions further facilitates:

sending, to the relay terminal, group information that carries a correspondence between the group identifier and the network address.

* * * * *